United States Patent [19]
Arazi

[11] Patent Number: 5,448,639
[45] Date of Patent: Sep. 5, 1995

[54] DIGITAL SIGNATURE DEVICE

[75] Inventor: Benjamin Arazi, Omer, Israel

[73] Assignee: Fortress U&T Ltd., Beer Sheva, Israel

[21] Appl. No.: 47,103

[22] Filed: Apr. 13, 1993

[30] Foreign Application Priority Data

Apr. 16, 1992 [IL] Israel ..................................... 101623

[51] Int. Cl.$^6$ .......................... H04L 9/30; G06F 7/52; G06F 7/72
[52] U.S. Cl. ......................................... 380/30; 380/23; 380/25; 380/49; 380/50; 364/746; 364/746.1; 364/754
[58] Field of Search ........................ 380/23, 25, 30, 49, 380/50; 364/754, 757-760, 746, 746.1

[56] References Cited

U.S. PATENT DOCUMENTS

| | | | |
|---|---|---|---|
| 4,625,076 | 11/1986 | Okamoto et al. ...................... | 380/23 |
| 4,891,781 | 1/1990 | Omura .......................... | 364/746.1 X |
| 5,121,431 | 6/1992 | Wiener ................................ | 380/49 |
| 5,210,710 | 5/1993 | Omura ............................... | 364/746.1 |

FOREIGN PATENT DOCUMENTS

| | | | |
|---|---|---|---|
| 0281303 | 9/1988 | European Pat. Off. ........ | G06F 7/60 |
| 0350278 | 1/1990 | European Pat. Off. ........ | G06F 7/72 |

OTHER PUBLICATIONS

John D. Lenk, *Handbook of Microprocessors, Microcomputers, & Minicomputers;* Chapter 4, pp. 203–266; (Prentice–Hall, 1979; ISBN 0-13-380378-3).

Tomlinson, "Modulo Multiplier to Enhance Encryption Rates", Electronic Engineering, vol. 62, No. 760, London, GB, 1990, p. 25.

Federal Register, Aug. 30, 1991, Federal Information Processing Standards Publication issued by the National Institute of Standards and Technology, "Announcing a Digital Signature Standard", Draft 19 Aug. 1991, front page and pp. 1–4.

Federal Information Processing Standards Publication, "Specifications for a Digital Signature Standard (DSS)", Draft 19 Aug. 1991, pp. 1–11.

*Primary Examiner*—Bernarr E. Gregory
*Attorney, Agent, or Firm*—Merchant, Gould, Smith, Edell, Welter & Schmidt

[57] ABSTRACT

A Digital Signature Device includes hardware device for carrying out an operation $AB2^{-n}$ mod N and an operation AB mod N, and carrying out modular exponentiation and modular multiplication based on an operation $AB2^{-n}$ mod N and an operation AB mod N. A method of performing an operation $AB2^{-n}$ mod N, an operation AB mod N, modular exponentiation, and modular multiplication by using hardware device, such as electrical controller, feeder, and delay device, etc.

40 Claims, 5 Drawing Sheets

FIG. 1

— bit
━ word

FIG. 2 select inputs external data inputs

DIGITAL SIGNATURE DEVICE

FIELD OF THE INVENTION

This invention relates to devices for applying digital signatures, to hardware for performing modular arithmetic operations that form the basis of modern cryptography and to methods for performing cryptographic operations such as are carried out in the operation of digital signature devices.

BACKGROUND OF THE INVENTION

Devices for applying digital signatures (hereinafter "digital signature devices" or DSD) form a rapidly developing branch of the art. A Digital Signature Standard has been published by the American NIST (NIST-DSS). However, this Standard, and all methods for performing cryptographic operations that have been suggested in connection with digital signature devices (hereinafter "DSD") involve the use of relatively complicated, and therefore expensive, hardware and/or software.

It is a purpose of this invention to provide a DSD that is simplified from the hardware viewpoint and hence is less expensive.

It is another purpose of this invention to provide new and improved circuits that are particularly useful to provide a preferred from of such a DSD, but can be used without connection with this latter to perform cryptographic operations.

It is a further purpose of this invention to provide methods for performing crytoographic operations by means of a DSD according to the invention.

A still further purpose of the invention is to provide a hardware-software package that can be integrated into a form of electronic card (electronic integrated circuit, PC board, and the like) that can implement the NIST-DSS process, the RSA process, and other public key cryptographic operations.

A further purpose of the invention is to provide methods for executing cryptographic operations regardless of the software or hardware means for executing them.

Other purposes and advantages of the invention will appear as the description proceeds.

SUMMARY OF THE INVENTION

The DSD according to the invention is characterized in that it comprises hardware or software means for carrying out modular exponentiation and/or modular multiplication operations.

The invention comprises a circuit for performing the Montegomery reduction operation $A \cdot B \cdot 2^{-n}$ mod N, comprising four registers for storing A, B and the values $(N-1)/2+1$ and $B+(N-1)/2+1$, a fifth register, means for successively selecting the content of either one of said B, $(N-1)/2+1$ or $B+(N-1)/2+1$ registers and feeding the same to means for performing multiplication, and means for updating the content of said fifth register n times, the final content thereof being the result of the operation.

Figure 1:
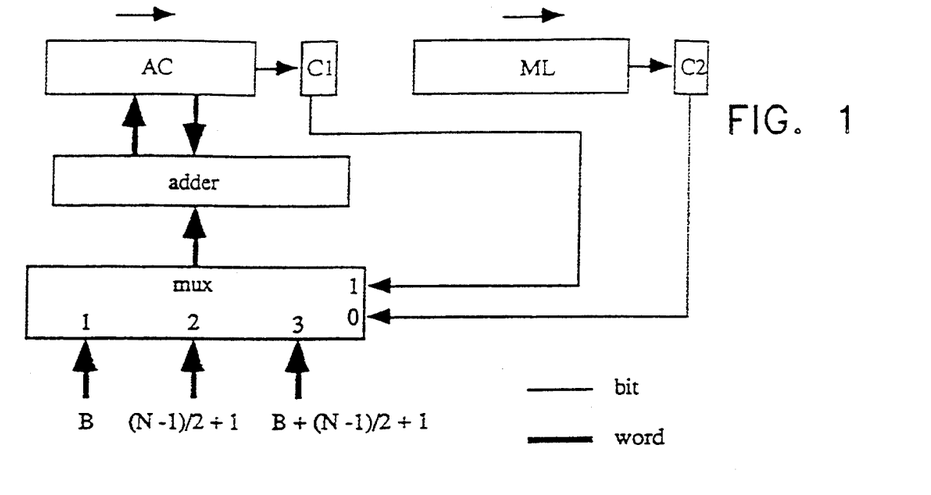
FIG. 1 illustrates the structure of a circuit for performing the operation $A \cdot B \cdot 2^{-n}$ mod N, according to a form of the invention.
Figure 2:
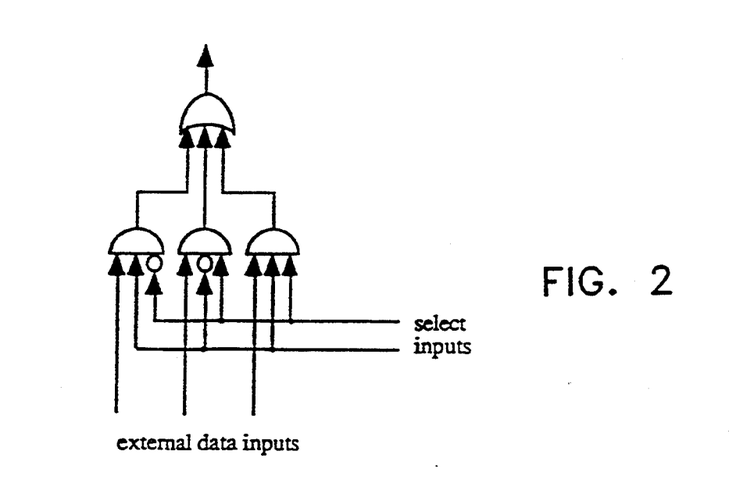
FIG. 2 illustrates a cell of the multiplexer of the circuit of FIG. 1.

The invention also comprises a circuit, specifically a multiplier, for calculating $AB2^{-n}$ mod N, the structure of which is represented in FIGS. 1 and 2.

Figure 3:
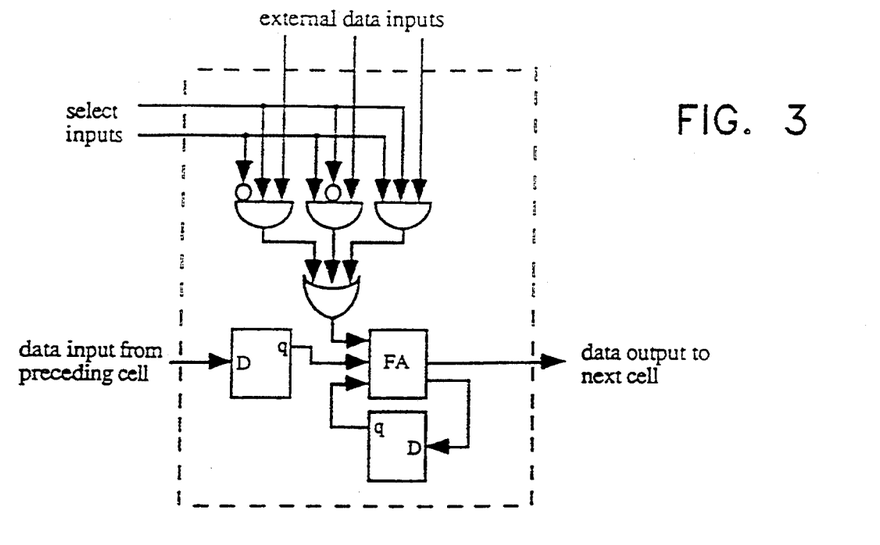
FIG. 3 illustrates a cell of a serial-parallel multiplier according to another form of the invention.
Figure 4:
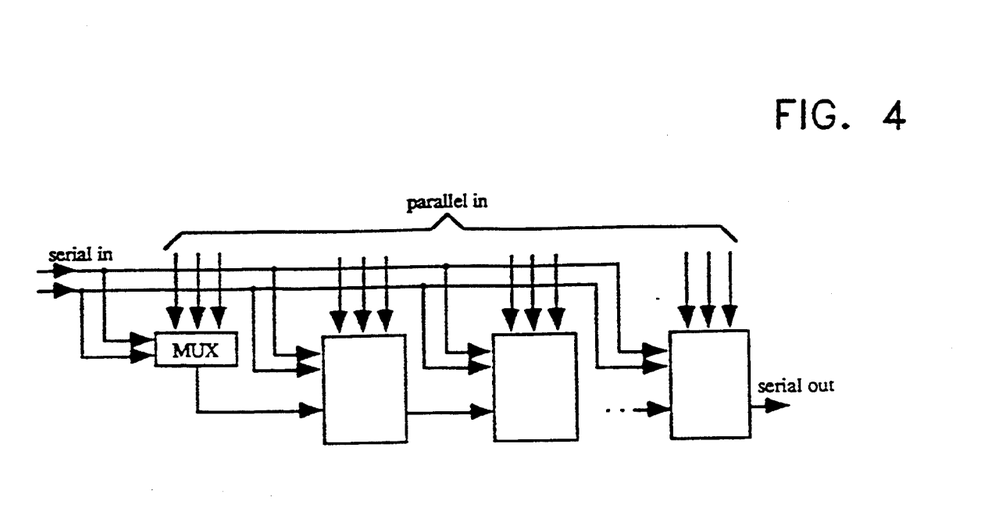
FIG. 4 illustrates the structure of the serial-parallel multiplier, consisting of the cells of FIG. 3.
Figure 5:
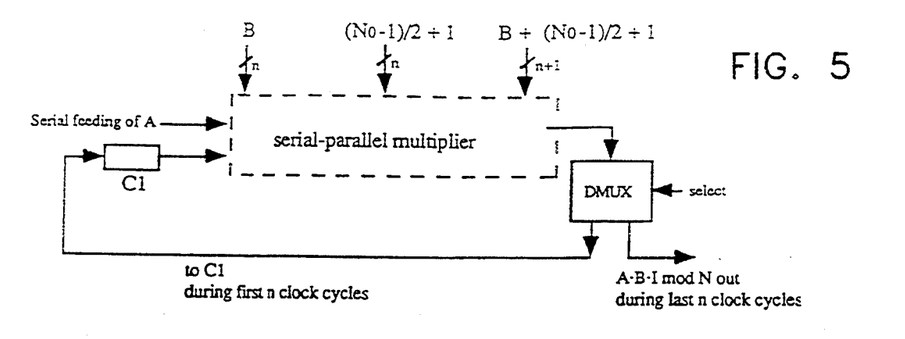
FIG. 5 illustrates a circuit comprising the multiplier of FIG. 4, for generating $A \cdot B \cdot 2^{-n}$ mod N.

The invention also comprises a circuit for calculating $AB2^{-n}$ mod N, using a serial-parallel multiplier, the structure of which is shown in FIGS. 3, 4 and 5.

The invention also comprises a process for carrying out the operation $A \cdot B \cdot 2^{-n}$ mod N, comprising initially storing the multiplicand in a first register, the predetermined numbers $(N-1)/2+1$ and $B+(N-1)/2+1$ in a second and third register respectively, successively and selectively feeding said numbers to means for performing multiplication, and progressively storing the output of said means in a register, the final content of which is the result of the operation.

The invention also provides means for carrying out cryptographic operations, useful in generating or applying a digital signature; digital signature devices comprising means for carrying said methods; and in general methods and means for generating or applying a digital signature, comprising carrying out said methods. Other preferred forms of the invention will be described hereinafter.

DETAILED DESCRIPTION OF PREFERRED EMBODIMENTS

According to one aspect of the invention, the operation $A \cdot B \cdot 2^{-n}$ mod N is performed by initially storing the multiplicand in a first register, the predetermined numbers $(N-1)/2+1$ and $B+(N-1)/2+1$ in a second and third register respectively, the value "0" in a fourth register and the multiplicand in a fifth register, and successively repeating n times the following operations: right-shifting the content of the fourth register by one bit, while transmitting the right-hand bit thereof to a multiplexer as the most significant control bit, and right-shifting the content of the fifth register by one bit, while transmitting the right-hand bit thereof to said multiplexer as the least significant control bit; selecting the content of one of said first three registers according to the values of said most and least significant control bits, if they are not both zero and transmitting it to said multiplexer and from the multiplexer to an adder; transmitting to said adder the value stored in said fourth register; and transmitting from said adder to said fourth register the sum of said last mentioned value and said selected input; the last value received by said fourth register being the result of the operation.

The multiplexer selects the input of the first register if said most and least significant control bits are respectively 0 and 1, the input of the second register if they are respectively 1 and 0, and the input of the third register if they are both 1. The value zero corresponds to the inputs 0, 0 and has therefore no influence on the operation.

FIGS. 1 and 2 illustrate a circuit for carrying out the above described process according to an embodiment of the invention. The circuit comprises four n-bit registers—register ML for storing the multiplier A, and three registers, not shown in the drawing, for storing the multiplicand B and the precalculated values $(N-1)/2+1$ and $B+(N-1)/2+1$, a fifth $n+1$—bit register AC, the final content of which is the result of the operation, a multiplexer, an n-bit adder and two latches C1 and C2, the multiplexer being connected to the B, $(N-1)/2+1$ and $B+(N-1)/2+1$ registers by word connections and to said two latches by bit connections for receiving input therefrom, the input from said two latches determining the selection among the said word inputs, and being connected for outputting its content to said adder, said fifth register and said ML register being connected each to one of said latches, said adder and said fifth register being mutually connected for transmitting their respective contents to one another, and control means, not shown, for right-shifting the contents of said ML register and said fifth register whereby to transmit at each shift their right-hand bits to the respective latches, said multiplexer having means for selecting its input from either one of said B, $(N-1)/2+1$ or $B+(N-1)/2+1$ registers depending on the one-bit inputs received from said latches. If the two latches both carry the value 0, the output from the multiplexer is the n-bit word zero.

The multiplexer comprises n cells, one of which is illustrated in FIG. 2, each cell comprising 3 AND gates, and an OR gate receiving its input from the AND gates and providing a bit of the multiplexer output, each AND gate having 3 inputs, one input being connected to one of the B, $(N-1)/2+1$ and $B+(N-1)/2+1$ registers, and the other two being connected to the latches C1 and C2. According to another aspect of the invention, the same operation $A \cdot B \cdot 2^{-n}$ mod N, is carried out by initially storing the multiplicand in a first register, the predetermined numbers $(N-1)/2+1$ and $B+(N-1)/2+1$ in a second and third register respectively, the value "0" in a fourth register and the multiplier in a fifth register, serially feeding the content of the A register to a serial-parallel multiplier, selecting at each clock cycle the content of one of said first, second or third register and parallel feeding it to said multiplier, back-feeding the output of said multiplier with a 1-clock delay during the first n clock cycles, and feeding said output to said fourth register during the remaining n clock cycles, thus updating its content, the final content of said fourth register being the result of the operation.

FIGS. 3 to 5 illustrate a circuit for carrying out the above described process according to another embodiment of the invention. The circuit comprises four registers, not shown in the drawing, for storing A, B and the values $(N-1)/2+1$ and $B+(N-1)/2+1$, and a fifth register, also not shown, the final content of which is the result of the operation; a serial/parallel multiplier having connections for receiving parallel input from either said B, $(N-1)/2+1$ or $B+(N-1)/2+1$ registers and the serial input from said A register, and having means for selecting one of said parallel inputs; a demultiplexer receiving input from said multiplier and further receiving a selection input from counter means (not shown), said demultiplexer being connected to said multiplier to feed back to it the input received therefrom during the first n clock cycles and to transmit to said fifth register the input received during the next n clock cycles. The value stored in said fifth register after said additional n clock cycles is the final result of the operation. Means C1 are inserted in the line from the demultiplexer to the multiplier for delaying by one clock cycle the input transmitted therethrough.

The inner structure of the multiplier is illustrated in FIG. 4. It is seen that it comprises a multiplexer and n cells connected in series, one of which is illustrated in FIG. 3. Each comprises 3 AND gates and an OR gate receiving its input from the AND gates, each AND gate having 3 inputs, one input being connected to one of the B, $(N-1)/2+1$ and $B+(N-1)/2+1$ registers, and the other two being connected to parallel input selecting means, an FA adder having a first input which is the output of the OR gate, having a second input from the preceding cell through a 1-clock delay means D, a feed-back to itself through another 1-clock delay means D, and an output to the next cell, the first of said cells having its first input from the A register and the last of said cells transmitting its output to the demultiplexer.

Figure 6:
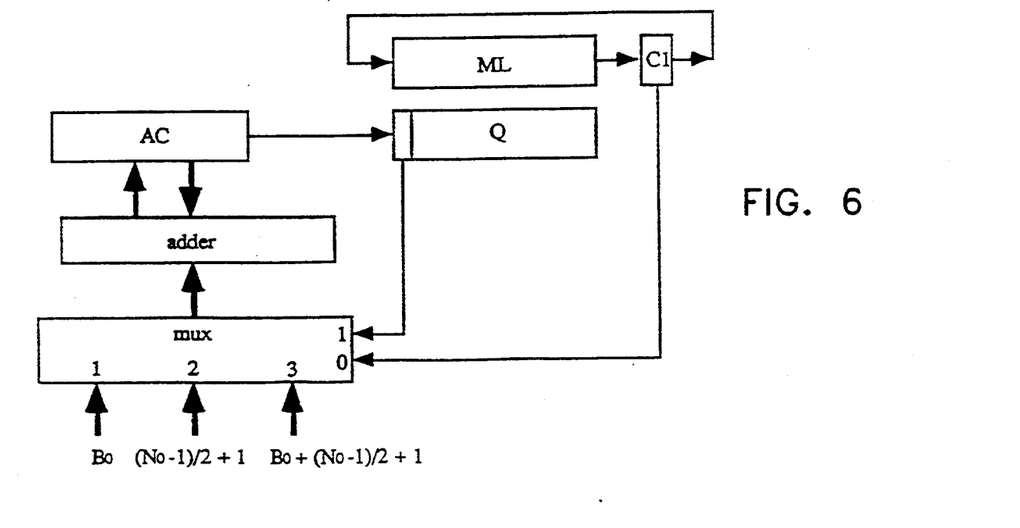
FIGS. 6 and 7 illustrate two modes of operation of a modification of the circuit of FIG. 1, for performing the operation $AB2^{-2n}$ mod N.
Figure 7:
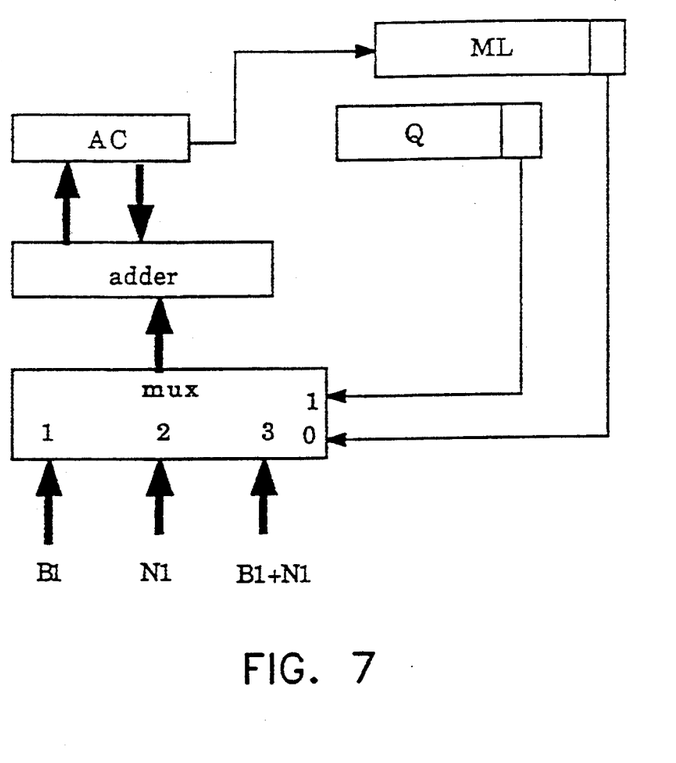

FIGS. 6, 7 show modifications of the circuit of FIG. 1. In FIG. 6 an additional register for storing a temporary value Q is provided (the leftmost bit of which performs the task of latch C1 of FIG. 1). All the components—registers, adder, multiplexer—are components having a number of bits that is one half the number of bits of the operands. FIG. 7 shows a circuit which is composed of the same hardware as that of FIG. 6, but with different connections, as clearly shown. The operation of both circuits is described hereinafter.

The operation of the circuits illustrated in the drawings will now be described.

Referring to FIG. 1, AC is of length $n+1$. ML is of length n. C1 and C2 are latches. The adder is expected to add two n-bits addends in one clock cycle. Its $(n+1)$-bits output enters AC. C1 and C2 are the select bits to a multiplexer. (if they are both 0, the output from the multiplexer is 0.)

The adder adds two n-bit addends in one clock cycle. (An extra FA is needed to accomodate for an extra bit. Their carry propagation management does not require extra delays if it is integrated with the shift operations described later.)

The major contribution of the invented circuit is in its ability to perform the operation $AB2^{-n}$ mod N in $n+1$ clock cycles.

The operation of the circut is demonstrated next for one byte operations.

A = 10100110,
B = 11100101,
N = 11110101.
$(N - 1)/2 + 1 = 1111011$,
$B + (N - 1)/2 + 1 = 101100000$.

|  | AC | C1 | ML | C2 | select bits |
|---|---|---|---|---|---|
| initial state | 0000000000 | 0 | 10100110 | 0 |  |
| shift | 0000000000 | 0 | 01010011 | 0 |  |
| add | 0000000000 | 0 | 01010011 | 0 | 00 |
| shift | 0000000000 | 0 | 00101001 | 1 |  |
| add | 0011100101 | 0 | 00101001 | 1 | 01 |
| shift | 0001110010 | 1 | 00010100 | 1 |  |
| add | 0111010010 | 1 | 00010100 | 1 | 11 |
| shift | 0011101001 | 0 | 00001010 | 0 |  |
| add | 0011101001 | 0 | 00001010 | 0 | 00 |
| shift | 0001110100 | 1 | 00000101 | 0 |  |
| add | 0011101111 | 1 | 00000101 | 0 | 10 |
| shift | 0001110111 | 1 | 00000010 | 1 |  |
| add | 0111010111 | 1 | 00000010 | 1 | 11 |
| shift | 0011101011 | 1 | 00000001 | 0 |  |
| add | 0101100110 | 1 | 00000001 | 0 | 10 |
| shift | 0010110011 | 0 | 00000000 | 1 |  |
| add | 0110011000 | 0 | 00000000 | 1 | 01 |
| shift | 0011001100 | 0 | 00000000 | 0 |  |

-continued

| | | |
|---|---|---|
| add | 0011001100 | 00 |

When the nine shift-and-add cycles terminate (n+1 cycle in the general case), the final contents of AC is $A \cdot B \cdot 2^{-n}$ mod N. (N is subtracted, at most once, if the contencts of AC is $\geq N$.)

The circuit of FIG. 1 can be modified in order to efficently enable, when desired, the calculation of $A \cdot B \cdot 2^{-2n}$ mod N for 2n-bit operands.

FIGS. 6 and 7 describe the functioning of a single modified circuit. Getting from one mode to the other is done by switching, not shown in the drawings. The circuit of FIG. 6 can, in itself, operate in the form described above, processing n-bit operands. The possibility of switching between the two modes shown in FIGS. 6 and 7 enables the operation $A_1A_0 \cdot B_1B_0 \cdot 2^{-2n}$ mod $N_1N_0$, where Ai, Bi, Ni are n-bit. $X_1X_0$ means concatenation. A main advantage of the described embodiment of the invention is the ability to process 2n-bit operands using n-bit circuitry.

We demonstrate the operation of the circuit for one hexa-word hardware. The one byte operands A,B, N are now doubled-sized. A=10100110, $A_1$=1010, $A_0$=0110. B=11100101, $B_1$=1110, $B_0$=0101. N=11110101, $N_1$−1111, $N_0$=0101. $(N_0-1)/2+1$=0011, $B_0+(N_0-1)+1$=1000, $B_1+N_1$=11101. AC is 6-bits, Q and ML are 4-bits, the adder adds 5-bits addends.

Step 1. The circuit is structured according to FIG. 6. Initially: AC and Q contain 1, and ML-C1 contain $A_0$(-the LSB of $A_0$ resides in C1).

| | AC | Q | ML | C1 | select bits |
|---|---|---|---|---|---|
| initial state | 000000 | 0000 | 0011 | 0 | |
| add | 000000 | 0000 | 0011 | 0 | 00 |
| shift | 000000 | 0000 | 0001 | 1 | |
| add | 000101 | 0000 | 0001 | 1 | 01 |
| shift | 000010 | 1000 | 1000 | 1 | |
| add | 001010 | 1000 | 1000 | 1 | 11 |
| shift | 000101 | 0100 | 1100 | 0 | |
| add | 000101 | 0100 | 1100 | 0 | 00 |
| shift | 000010 | 1010 | 0110 | 0 | |
| add | 000101 | | | | 10 |

Denote the present contents of AC and Q by $C_0$ and $Q_0$, respectively. We then have:

$A_0 \cdot B_0 + Q_0 \cdot N_0 = C_0 \cdot 10$. (10 denote $2^n$)

Step 2. The circuit is structured according to FIG. 7. Initially: AC and Q and ML contain their present values (i.e., those obtained at the end of the preceding Step).

| | AC | ML | Q | select bits |
|---|---|---|---|---|
| initial state | 000101 | 0110 | 1010 | |
| add | 000101 | 0110 | 1010 | 00 |
| shift | 000010 | 1011 | 0101 | |
| add | 011111 | 1011 | 0101 | 11 |
| shift | 001111 | 1101 | 0010 | |
| add | 011101 | 1101 | 0010 | 01 |
| shift | 001110 | 1110 | 0001 | |
| add | 011101 | 1110 | 0001 | 10 |
| shift | 001110 | 1111 | 0000 | |

The value stored now in the concatenation AC;ML is $S = A_0 \cdot B_1 + Q_0 \cdot N_1 + C_0$. ($Q_0$ and $C_0$ were the contents of Q and AC at the beginning of this Step.)

If S exceeds N, then N is subtracted (at most once).

The following re-setting procedure is now performed, requiring $n \div 2$ clock cycles.

a) Store $S_1$ (the contents of AC) in a buffer.
b) While the contents of AC is shifted out, $S_0$ (the contents of ML) is shifted into AC.
c) While the contents of ML is shifted out, ML-C1 is loaded with $A_1$ (the LSB of $A_1$ resides in C1).

Step 3. The circuit is structured-according to FIG. 6.

| | AC | Q | ML | C1 | select bits |
|---|---|---|---|---|---|
| initial state | 001111 | 0000 | 0101 | 0 | |
| add | 001111 | 0000 | 0101 | 0 | 00 |
| shift | 000111 | 1000 | 0010 | 1 | |
| add | 001111 | 1000 | 0010 | 1 | 11 |
| shift | 000111 | 1100 | 1001 | 0 | |
| add | 001010 | 1100 | 1001 | 0 | 10 |
| shift | 000101 | 0110 | 0100 | 1 | |
| add | 001010 | 0110 | 0100 | 1 | 01 |
| shift | 000101 | 0011 | 1010 | 0 | |
| add | 000101 | | | | 00 |

Denote the present contents of AC and Q by $C_1$ and $Q_1$, respectively. We then have:

$S_0 + A_1 \cdot B_0 + Q_1 \cdot N_0 = C_1 \cdot 10$. (S0 was the contents of AC at the beginning of this Step.)

Step 4. The circuit is structured according to FIG. 7. Initially: AC and Q and ML contain their last obtained values.

| | AC | ML | Q | select bits |
|---|---|---|---|---|
| initial state | 000101 | 1010 | 0011 | |
| add | 010100 | 1010 | 0011 | 10 |
| shift | 001010 | 0101 | 0001 | |
| add | 100111 | 0101 | 0001 | 11 |
| shift | 010011 | 1010 | 0000 | |
| add | 010011 | 1010 | 0000 | 00 |
| shift | 001001 | 1101 | 0000 | |
| add | 010111 | 1101 | 0000 | 01 |
| shift | 001011 | 1110 | 0000 | |

The value stored now in the concatenation AC;ML is $T = A_1 \cdot B_1 + Q_1 \cdot N_1 + C_1$. ($Q_1$ and $C_1$ were the contents of Q and AC at the beginning of this Step.)

The value of $U = T + S_1$ is now calculated. ($S_1$ is the value stored in a buffer after Step 2.)

If U exceeds N, then N is subtracted (at most twice).

$U = A_1A_0 \cdot B_1B_0 \cdot 2^{-n}$ mod $N_1N_0$

Performing $A \cdot B \cdot 2^{-n}$ mod N by using a serial-parallel multiplier illustrated in FIGS. 3 to 5, will now be described.

One cell in the proposed serial-parallel multiplier is shown in FIG. 3. FIG. 4 exhibits the structure of a serial-parallel multiplier, consisting of an array of cells of the described form.

The circuit of FIG. 5 generates $A \cdot B \cdot 2^{-n}$ mod N. C1 is a latch or flip-flop that delays the output from the multiplier for one clock cycle before feeding it back in as a select input. The serial-parallel multiplier consists of n cells preceded by a multiplexer (mux).

The circuit operates in 2n clock cycles. During the first n cycles, the output bit forms one of the select inputs to the internal multiplier's multiplexer, after a delay of one cycle. The bits fed out during the last n clock cycles form the value of $A \cdot B \cdot 2^{-n}$ mod N.

Assuming the practical case of modular exponentiation, there is a following modular multiplication stage in which the generated bits of $A \cdot B \cdot 2^{-n}$ mod N play the role of A or B (or both in the case the next stage is squaring). Note that during the serial generation of $A \cdot B \cdot 2^{-n}$ mod N the external serial and parallel inputs to the multiplexer are blocked (considered to be 0's). The input registers can therefore be loaded during these n clock cycles, being prepared for the next stage. Depending on relevancy, the bits of $A \cdot B \cdot 2^{-n}$ mod N fed out can be added, via a serial adder, to $(N_0 \cdot 1)/2 + 1$, forming the new stored $B + (N_0 - 1)/2 + 1$ (fed in parallel at the next stage), and/or they can be fed into the register that serially feeds A at the next stage.

A few extra clock cycles may be needed for completing the preparations for the next stage.

It can be concluded that the serial-parallel multiplier performs $A \cdot B \cdot 2^{-n}$ mod N in 2n clock cycles, including the overhead incurred by having to load the input registers for the next stage. The main advantage of the invented circuit is in its ability to operate at a high clock rate, as the delay between two clock signals is limited just by the time needed for one Full-Adder to operate.

To demonstrate the functioning of the circuit we calculate $A \cdot B \cdot 2^{-n}$ mod N for the preceding values. $A = 10100110$, $B = 11100101$, $N = 11110101$, $(N-1)/2+1 = 1111011$, $B+(N-1)/2+1 = 101100000$.

| contents of the left FF in a cell | contents of the bottom FF in a cell | output bit | select bits |
|---|---|---|---|
| 00000000 | 00000000 | 0 | 00 |
| 01110010 | 00000000 | 1 | 01 |
| 10001001 | 01100000 | 0 | 11 |
| 01110100 | 00000000 | 1 | 00 |
| 00000111 | 01110000 | 1 | 10 |
| 10001011 | 01100000 | 1 | 11 |
| 01001000 | 01101011 | 0 | 10 |
| 01100011 | 01101011 | 0 | 01 |
| 00000101 | 01100001 | 0 | 00 |
| 00110010 | 00000001 | 0 | |
| 00011001 | 00000000 | 1 | |
| 00001100 | 00000000 | 1 | |
| 00000110 | 00000000 | 0 | |
| 00000011 | 00000000 | 0 | |
| 00000001 | 00000000 | 1 | |
| 00000000 | 00000000 | 1 | |

The bits fed out serially during the last eight clock cycles are 11001100, which coincides with the value obtained before. Obviously, the select bits also coincide with those obtained before.

A digital signature device according to the invention is characterized in that it comprises hardware or software means for carrying out modular exponentiation and/or modular multiplication operations. These can be based on the operation $A \cdot B \cdot 2^{-n}$ mod N or on a direct modular multiplication (i.e., the operation $A \cdot B$ mod N). Said hardware means may be the novel circuits hereinbefore described, but they may also be other hardware means.

Methods of performing various operations, according to the present invention, will now be described. They are described, by way of preferred example, as using the aforesaid novel circuits, but they are not limited to such a use. Said methods may be performed by hardware or software means, using special or general purpose hardware, suitably programmed.

Method No. 1—The performance of a standard modular multiplication, that is, the operation AB mod N, based on the operation $A \cdot B \cdot 2^{-n}$ mod N, will now be described. The mathematics applied herein is taken from: L. Montgomery, "Modular Multiplication Without Trial Division", Mathematics of Computation, vol. 44, pp. 519-521, 1985.

Precalculation: $H = 2^{2n}$ mod N.

Step 1: Calculate $F = A \cdot B \cdot 2^{-n}$ mod N using the circuits of invention 1 or 3.

Step 2: Calculate $F \cdot H \cdot 2^{-n}$ mod $N = A \cdot B$ mod N.

Method No. 2—The NIST-DSS standard requires the calculation of t mod q where t is n-bit long, q is s-bit long, n>s. Method No. 1 according to the invention permits to perform the operation $A \cdot B$ mod N for n-bit values. It is now shown how this operation ($A \cdot B$ mod N) permits the calculation of t mod q.

The inputs to the n-bit modular multiplier are A, B, N. The output is AB mod N.

Define $A = t$, $B = 2^{n-s}$ and $N = q \cdot 2^{n-s}$.

t mod $q = $(AB mod N)$/2^{n-s}$. (It is guaranteed that AB mod N has here $n-s$ least significant 0's.)

The division by $2^{n-s}$ is simply done by shifting the register, in which AB mod N resides, $n-s$ places to the right, without the need of providing any additional hardware.

Note that it may well happen here that $A > N$. If it is required that the inputs A, B should initially be smaller than N, then if in the present case $A > N$, perform $A = A - N$ before entering it into the multiplier.

Method No. 3—Performing an ordinary division operation will now be described.

Calculating DV:DI takes the following steps.

1) Calculate DV mod DI using Method No. 2 hereinbefore described. This already gives the remainder obtained from the operation DV-DL.

2) The quotient of DV-DI equals that obtained from the operation [DV−(DV mod DI)]DI, where the latter guarantees 0 remainder. (That is, DI is a factor of [DV−(DV mod DI)].)

It is now shown how the circuit illustrated in FIGS. 1 and 2 can perform a 0 remainder division. That is, a division in which the divisor is known to be a factor of the dividend.

Let DV be an n-bit dividend and let DI be an m-bit divisor of DV. Q is the quotient and there is 0 remainder (i.e., DV=DI×Q)

Without loss of generality we assume that DI is odd (otherwise, both DV and DI are right shifted until the LSB of DI is 1).

The following is a process for calculating Q=DV:DL

If DV mod $2^{n-m} = 0$, then $DV = DI \times 2n - m$ and therefore $Q = 2^{n-m}$ and the 'division' process terminates.

Figure 8:
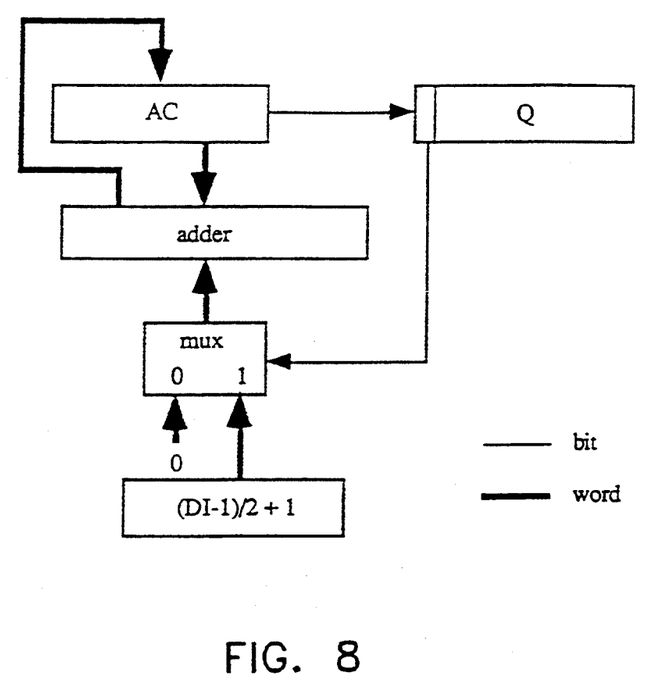
FIG. 8 illustrates a modification of the circuit of FIG. 1 for performing 0-remainder divisions.

If DV mod $2^{n-m} \neq 0$, then consider the modified configuration of the circuit of FIG. 1 illustrated in FIG. 8. This operates as follows. The accumulator AC is right-shifted. Its initial contents is $2^{n-m} - $(DV mod $2^{n-m}$). Its LSB controls the addition of $(DI-1)/2+1$. The final contents of the register Q is the desired quotient Q.

This shift-and-add process is essentially a multiplication operation. That is, 0-remainder division is implemented by one multiplication.

The following demonstrates the operation principle.

Take DV=10000111, and DI=101. (DI-1)/2+1=011.

|  | AC | Q |
|---|---|---|
| initial value | 011001 | 00000 |
| shift | 001100 | 10000 |
| add (DI-1)/2 + 1 | 001111 | 10000 |
| shift | 000111 | 11000 |
| add (DI-1)/2 + 1 | 001010 | 11000 |
| shift | 000101 | 01100 |
| shift | 000010 | 10110 |
| add (DI-1)/2 + 1 | 000101 | 10110 |
| shift | 000010 | 11011 |

The final contents of register Q is 11011.

It can be checked that $DV = DI \times Q$.

The invented process has also the following software meaning.

Notations:

X(i) denotes the i-th bit in the binary representation of an integer X. (The LBS is X(0).)

The following is a process for calculating Q=DV.DI.

If $DV \bmod 2^{n-m} = 0$, then $DV = DI \times 2^{n-m}$ and therefore $Q = 2^{n-m}$ and the 'division' process terminates.

If $DV \bmod 2^{n-m} \neq 0$, then set $AC = 2^{n-m} - DV \bmod 2^{n-m}$ and apply the following process.

```
for j ← 0 to n − m − 2
   Q(j) = AC(0)
   if AC(0) = 1 then AC = AC + DI
   shift-right AC (once)
Q(n − m − 1) = AC(0)
Demonstration:
Take DV = 10000111, and DI = 101.
n − m = 8 − 3 = 5.
DV mod 2^(n−m) = 10000111 mod 2^5 = 00111.
```

Listed next are the values of AC during the entire process. (We take a 6-bit AC since its values are obtained by adding 3-bit and 5-bit values.)

```
initial value of AC:
2^(n−m) − DV mod 2^(n−m) 2^5 −   00111 =
                                         011001
j = 0
Q(0) = 1
add DI                                   011110
shift                                    001111
j = 1
Q(1) = 1
add DI                                   010100
shift                                    001010
j = 2
Q(2) = 0
shift                                    000101
j = 3
Q(3) = 1
add DI                                   001010
shift                                    000101
Q(4) = 1
Q = 11011.
```

Method No. 4—The performance of a Euclid algorithm, using a divisionless process, based on the availability of a modular multiplier, will now be described.

The importance of the method lies in the fact that the Euclid algorithm is used very frequently in cryptography, mainly in calculating the modular multiplicative inverse of integers.

Calculating the modular multiplicative inverse of integers means the following: Given two integers V and U, which are relatively prime, find an integer W, denoted by $V^{-1} \bmod U$, such that $V - W \bmod U = 1$.

This is important in RSA key generation and in applying the NIST-DSS signature generation and signature verification.

The Euclid algorithm is explicitly based on division operations. Based on Method No. 3, these can be executed by a modular multiplication process, followed by 0-remainder division, which, in itself, is implemented by a multiplication operation.

Method No. 5-Calculating $e^{-1} \bmod f(n)$, for a small e. This method is based on Methods No. 2 and No. 3 and does not require any additional hardware, but only requires a small table lookup.

The method relates to the calculation of the multiplicative inverse of e mod $\phi(n)$ in RSA key generation, for a small e, by multiplications only.

Note the following simple equivalent to Euclid considerations:

$$, e^{-1} \bmod \phi(n) = [(-(\phi(n) \bmod e)^{-1} \bmod e) \cdot \phi(n) + 1]/e.$$

Based on the above, $e^{-1} \bmod \phi(n)$ is calculated by the following steps.

1: Calculate $\phi(n) \bmod e$. This is done by Method No. 2.

2: Calculate $-(\phi(n) \bmod e)^{-1} \bmod e$. The multiplicative inverse of the result obtained in the above step is now taken modulo e. (It can be proved that it always exists.) Here we observe that e, in practice, is a small, usually known in advance, number. Therefore, a list of the multiplicative inverses modulo e of all values smaller than e (and relatively prime to it) can be precalculated and stored.

3: Multiply the value obtained in the preceding step by $\phi(n)$, and add 1.

4: Divide the preceding result by e, using the 0-remainder division process described in Method No. 3

Method No. 6-Performing a complete modular exponentiation.

The performance of the operation $A \cdot B \cdot 2^{-n} \bmod N$ has been described (Method No. 1). The present method uses it in performing modular exponentiation, viz., calculating $A^E \bmod N$. This operation is the most needed operation in any public key cryptographic application.

The method is carried out as follows.

Precalculation: $D = R^{2m+E} \bmod N$, for $R = 2^n$.

The invention relates to those cases where such a precalculation, which depends on the specific exponent E and the modulus N, is justified.

E(j) denotes the j-th bit in the binary representation of the exponent E, starting with the MSB whose index is 1.

$B = 1$
for j ← 1 to m
 $B = B \cdot B \cdot 2^{-n} \bmod N$
 if $E(j) = 1$ then $B = A \cdot B \cdot 2^{-n} \bmod N$.

Final step: calculate $D \cdot B \cdot 2^{-n} \bmod N$. This value is the desired final result $A^E \bmod N$.

Method No. 7—This method represents another way of performing a complete modular exponentiation, especially suitable for implementing NIST-DSS operations.

The operation $A \cdot B \cdot 2^{-n}$ mod N has been described. The present method uses it in performing modular exponentiation, viz., in calculating $A^E$ mod N. It consists of the following steps.

Precalculation: $H = R^2$ mod N, and $L = R^{2n}$ mod N, for $R = 2^n$.

The invention relates to the more general cases where the modulus N is known beforehand, but the exponent is not determined, except for its length in bits, which is assumed to be n (the same as that of the operands). It specifically relates to the DSS (Digital Signature Standard) specified by the American NIST, and/or other methods based on modular exponentiations over prespecified modulus.

E(j) denotes the j-th bit in the binary representation of the n-bit exponent E, starting with the MSB whose index is 1. For n-bit operands, $F = A \cdot H \cdot 2^{-n}$ mod N.
$B = 1$
for $j \leftarrow 1$ to $n$
$\quad B = B \cdot B \cdot 2^{-n}$ mod N.
$\quad$ if $E(j) = 1$ then $B = F \cdot B \cdot 2^{-n}$ mod N.

Final step: calculate $L \cdot B \cdot 2^{-n}$ mod N. This value is the desired final result $A^E$ mod N.

Method No. 8—This method permits to calculate the multiplicative inverse of e mod $\phi(n)$ in RSA key generation, using a modular exponentiation, carried out e.g. by Method No. 7.

The method is based on the observation that security considerations dictate that p should be of the following form, where similar considerations apply for q (p and q are the prime factors of n.)

Security considerations dictate that $p = 2ar + 1$ and $q = 2jv + 1$, for large primes r, v. The values a, r, j, v, $\phi(a)$ and $\phi(j)$ are known to the party that generates p and q, which is the same party that has to calculate $e^{-1}$. (a, r, j, v are a 'by-product' of the process that generated p and q.)

It can be shown that $e^{[2\phi(a)\phi(j)(r-1)(v-1)-1]} \mod (4 \cdot a \cdot j \cdot r \cdot v)$.

Since the values of $\phi(a)$ and $\phi(j)$ are trivially recovered, we are thus able to calculate $e^{-1}$ by a single modular exponentiation operation, preceded by some multiplications. The modular exponentiation can be carried out by Method No. 7.

Method No. 9—This method provides for performing the operation $k^{-1}$ mod q, or $s^{-1}$ mod q, used in NIST−DSS, by an exponentiation operation, which, in itself, can be effected, e.g., by Method No. 7.

The major contribution of this method is due to the fact that the NIST-DSS publication (Federal Register, Aug. 30 1991, pp. 42919-43546, indicate the usage of the Euclid algorithm, involving division operations, and a dedicated control program. The present method avoids this overhead, calculating the modular multiplicative inverse modulo q by using the already available modular exponentiator, which forms an integral part of the DSS circuitry.

For a prime q: $b^{q-1} = 1$ mod q, for any $0 < b < q$.

The value of $k^{-1}$ mod q is therefore $k^{q-2}$ mod q.

The above modular exponentiation can be effected according to Method No. 7.

I claim:

1. A circuit for performing an operation $A \cdot B \cdot 2^{-n}$ mod N, comprising:
   four registers for storing A, B and the values $(N-1)/2+1$ and $B+(N-1)/2+1$;
   a fifth register;
   apparatus for successively selecting a content of one of said B, $(N-1)/2+1$ and $B+(N-1)/2+1$ registers;
   apparatus for feeding the content of B, $(N-1)/2+1$ and $B+(N-1)/2+1$ to apparatus for performing multiplication;
   apparatus for updating a content of said fifth register n times, a final content thereof being a result of the operation; and
   digital signature apparatus operative to employ the final content in a digital signature operation.

2. A circuit according to claim 1, wherein the digital signature operation comprises generation of a digital signature.

3. A circuit according to claim 1, wherein the digital signature operation comprises verification of a digital signature.

4. A circuit for performing an operation $A \cdot B \cdot 2^{-n}$ mod N, comprising:
   four n-bit registers for storing A, B and the values $(N-1)/2+1$ and $B+(N-1)/2+1$;
   a fifth n+1 bit register a final content of which is a result of the operation;
   an adder;
   a multiplexer being connected to the B, $(N-1)/2+1$ and $B+(N-1)/2+1$ registers for selectively receiving input therefrom and being connected for outputting its content to said adder, said adder and said fifth register being mutually connected for transmitting their respective contents to one another;
   control apparatus for right-shifting a content of said A register and said fifth register;
   apparatus for transmitting at each shift the right-hand bits of said A and fifth register to said multiplexer, said multiplexer further having apparatus for selecting its input from one of said B, $(N-1)/2+1$ and $B+(N-1)/2+1$ registers depending on the two aforesaid right-hand bits transmitted to it; and
   digital signature apparatus operative to employ the final content in a digital signature operation.

5. A modified circuit according to claim 4, comprising an additional register for storing temporary values, and having components the number of bits of which is one half the number of bits of the operands.

6. A circuit according to claim 4, wherein the digital signature operation comprises generation of a digital signature.

7. A circuit according to claim 4, wherein the digital signature operation comprises verification of a digital signature.

8. A circuit for performing an operation $A \cdot B \cdot 2^{-n}$ mod N, comprising:
   four n-bit registers for storing A, B and the values $(N-1)/2+1$ and $B+(N-1)/2+1$;
   a fifth n+1 bit register a final content of which is a result of the operation; an adder;
   a multiplexer being connected to the B, $(N-1)2+1$ and $B+(N-1)/2+1$ registers for selectively receiving input therefrom and being connected for outputting its content to said adder, said adder and said fifth register being mutually connected for transmitting their respective contents to one another;

control means for right-shifting a content of said A register and said fifth register and means for transmitting at each shift the right-hand bits of said A and fifth register to said multiplexer, said multiplexer further having means for selecting its input from one of said B, $(N-1)/2+1$ and $B+(N-1)/2+1$ registers depending on the two aforesaid right-hand bits transmitted to it; and wherein the multiplexer comprises n cells, each cell comprising three AND gates, and an OR gate receiving its input from the AND gates and providing a bit of the multiplexer output, each AND gate having three inputs, one input being connected to one of the B, $(N-1)/2+1$ and $B+(N-1)/2+1$ registers, and the other two being connected to the means for transmitting the right-hand bits of the A and fifth registers to the multiplexer.

9. A circuit for performing the operation $A \cdot B \cdot 2^{-n}$ mod N, comprising:

four registers for storing A, B and the values $(N-1)/2+1$ and $B+(N-1)/2+1$;

a fifth register the final content of which is the result of the operation;

a serial/parallel multiplier having connections for receiving parallel input from either said B, $(N-1)/2+1$ and $B+(N-1)/2+1$ registers and serial input from said A register, and having apparatus for selecting one of said parallel inputs;

a demultiplexer receiving input from said multiplier and further receiving an input from counter apparatus, said demultiplexer being connected to said multiplier to feed back to it the input received therefrom during the first n clock cycles and to transmit to said fifth register the input received during the next n clock cycles;

the value stored in said fifth register after said additional n clock cycles being a final result of the operation;

apparatus being inserted in the line from the demultiplexer to the multiplier for delaying by one clock cycle the input transmitted therethrough; and digital signature apparatus operative to employ said final result in a digital signature operation.

10. A circuit according to claim 9, wherein the digital signature operation comprises generation of a digital signature.

11. A circuit according to claim 9, wherein the digital signature operation comprises verification of a digital signature.

12. A circuit for performing the operation $A \cdot B \cdot 2^{-n}$ mod N, comprising:

four registers for storing A, B and the values $(N-1)/2+1$ and $B+(N-1)/2+1$;

a fifth register the final content of which is the result of the operation;

a serial/parallel multiplier having connections for receiving parallel input from either said B, $(N-1)/2+1$ or $B+(N-1)/2+1$ registers and serial input from said A register, and having means for selecting one of said parallel inputs;

a demultiplexer receiving input from said multiplier and further receiving an input from counter means, said demultiplexer being connected to said multiplier to feed back to it the input received therefrom during the first n clock cycles and to transmit to said fifth register the input received during the next n clock cycles;

the value stored in said fifth register after said additional n clock cycles being the final result of the operation;

means being inserted in the line from the demultiplexer to the multiplier for delaying by one clock cycle the input transmitted therethrough; and wherein the multiplier comprising n serially connected cells, each comprising three AND gates and an OR gate receiving its input from the AND gates, each AND gate having three inputs, one input being connected to one of the B, $(N-1)/2+1$ and $B+(N-1)/2+1$ registers, and the other two being connected to parallel input selecting means, an adder having a first input which is the output of the OR gate, having a second input from the preceding cell through a 1-clock delay means, a feedback to itself through a 1-clock delay means, and an output to the next cell, the first of said cells having its first input from A register and the last of said cells transmitting its output to the demultiplexer.

13. A method of performing an operation $A \cdot B \cdot 2^{-n}$ mod N, A being a multiplier and B is a multiplicand, having n bits, comprising the steps of:

initially storing the multiplicand in a first register, predetermined numbers $(N-1)/2+1$ and $B+(N-1)/2+1$ in a second and third register respectively, the value "0" in a fourth register and the multiplier in a fifth register;

providing control means;

successfully repeating n times the following steps:

right-shifting a content of the fourth register by one bit by said control means, while transmitting a right-hand bit thereof to a multiplexer as the most significant control bit, and right-shifting a content of the fifth register by one bit by said control means, while transmitting the right-hand bit thereof to said multiplexer as the least significant control bit;

selecting a content of one said first three registers according to the values of said most and least significant control bits, if they are not both zero and transmitting it to the multiplexer and from the multiplexer to an adder;

transmitting to said adder the value stored in said fourth register, transmitting from said adder to said fourth register the sum of said last mentioned value and said selected input;

finally receiving a last value by said fourth register, wherein the last value is a result of the operation; and using the last value in a digital signature operation.

14. Method according to claim 13, wherein the multiplexer selects the input of the first register if the most and the least significant control bit are respectively 0 and 1, the input of the second register if they are respectively 1 and 0, and the input of the third register if they are both 1.

15. Method according to claim 13, wherein the multiplexer is a number t of n bits, the multiplicand is 2 (n−s), and the modulus is q*B, the result being t mod q, which has s bits.

16. A method of performing modular exponentiation $A^z$ mod N, wherein A is a number to be exponentiated, E an exponent and N a modulus, by performing all multiplying operations by the method of claim 13, all squaring operations by the method of claim 13 wherein A is both the multiplier and the multiplicand, and performing one more time the method of claim 13 wherein the multiplicand is the final result of the previous operations and the multiplier is the number $D=R^{2m}+E$ mod N, wherein $D=R^{2m}$, thereby producing a result, and using the result in a digital signature operation.

17. A method according to claim 16, wherein the digital signature operation comprises generation of a digital signature.

18. A method according to claim 16, wherein the digital signature operation comprises verification of a digital signature.

19. Method for generating and applying a digital signature, comprising carrying out a method of performing modular exponentiation $A^Z$ mod N, wherein A is a number to be exponentiated, E an exponent and N a modulus, by performing all multiplying operations by the method of claim 13, all squaring operations by the method of claim 13 wherein A is both the multiplier and the multiplicand, performing one more time the method of claim 13 wherein the multiplicand is the final result of the previous operations and the multiplier is the number $D=R^{2m}+E$ mod N, wherein $D=R^{2m}$, thereby producing a result, and using the result in order to perform a digital signature operation.

20. A method according to claim 19, wherein the digital signature operation comprises generation of a digital signature.

21. A method according to claim 19, wherein the digital signature operation comprises verification of a digital signature.

22. A method according to claim 13, wherein the digital signature operation comprises generation of a digital signature.

23. A method according to claim 13, wherein the digital signature operation comprises verification of a digital signature.

24. A method of performing an operation $A \cdot B \cdot 2^{-n}$ mod N, A being a multiplier and B is a multiplicand, having n bits, comprising initially storing the multiplicand in a first register, predetermined numbers $(N-1)/2+1$ and $B+(N-1)/2+1$ in a second and third register respectively, a value "0" in a fourth register and the multiplier in a fifth register, comprising the steps of:
   providing feeding apparatus, said feeding apparatus connecting to said multiplier;
   serially feeding a content of the fifth register to a serial-parallel multiplier, selecting at each clock cycle a content of one of said first, second or third register and parallel feeding the content of one of said first, second or third register to said multiplier;
   providing delaying apparatus, said delaying apparatus being inserted in a line from the feeding apparatus to said multiplier;
   back-feeding an output of said multiplier with a 1-clock delay during a first n clock cycles;
   feeding said output to said fourth register during the remaining n clock cycles, thus updating the content of said fourth register, a final content of said fourth register being a result of the operation; and
   using the result in a digital signature operation.

25. A method according to claim 24, wherein the digital signature operation comprises generation of a digital signature.

26. A method according to claim 24, wherein the digital signature operation comprises verification of a digital signature.

27. Method for generating and applying a digital signature, comprising carrying out a method of performing an operation $A \cdot B \cdot 2^{-n}$ mod N, A being a multiplier and B is a multiplicand, having n bits, comprising the steps of:
   initially storing the multiplicand in a first register, predetermined number $(N-1)/2+1$ and $B+(N-1)/2+1$ in a second and third register respectively, the value "0" in a fourth register and the multiplier in a fifth register;
   providing control apparatus;
   successively repeating n times the following steps:
      right-shifting a content of the fourth register by one bit by said control apparatus, while transmitting a right-hand bit thereof to a multiplexer as the most significant control bit, and right-shifting a content of the fifth register by on bit by said control apparatus, while transmitting the right-hand bit thereof to said multiplexer as the least significant control bit;
   selecting a content of one of said first three registers according to the values of said most and least significant control bits, if they are not both zero and transmitting it to the multiplexer and from the multiplexer to an adder;
   transmitting to said adder the value stored in said fourth register, transmitting from said adder to said fourth register the sum of said last mentioned value and said selected input;
   finally receiving a last value by said fourth register, wherein the last value being a result of the operation; and
   using the result in a digital signature operation.

28. A method according to claim 27, wherein the digital signature operation comprises generation of a digital signature.

29. A method according to claim 27, wherein the digital signature operation comprises verification of a digital signature.

30. A Digital Signature Device, which comprises hardware apparatus for carrying out modular exponentiation, modular multiplication based on an operation $A \cdot B \cdot 2^{-n}$ mod N, an operation $A \cdot B \cdot 2^{-n}$ mod N, said hardware apparatus comprising a circuit for performing an operation $A \cdot B \cdot 2^{-n}$ mod N, the circuit comprising:
   four registers for storing A, B and the values $(N-1)/2+1$ and $B+(N-1)/2+1$;
   a fifth register;
   apparatus for successively selecting a content of one of said B, $(N-1)/2+1$ and $B+(N-1)/2+1$ registers and for feeding the content of B, $(N-1)/2+1$ and $B+(N-1)/2+1$ to apparatus for performing multiplication;
   apparatus for updating a content of said fifth register n times, a final content thereof being a result of the operation; and
   digital signature apparatus operative to employ the final content in a digital signature operation.

31. A circuit according to claim 30, wherein the digital signature operation comprises generation of a digital signature.

32. A circuit according to claim 30, wherein the digital signature operation comprises verification of a digital signature.

33. A circuit for performing an operation $A \cdot B \cdot 2^{-n}$ mod N, comprising:
   four n-bit registers for storing A, B and the values $(N-1)/2+1$ and $B+(N-1)/2+1$;

a fifth n−1 bit register a final content of which is a result of the operation; an adder;

a multiplexer being connected to the B, (N−1)/2+1 and B+(N−1)/2+1 registers for selectively receiving input therefrom and being connected for outputting its content to said adder, said adder and said fifth register being mutually connected for transmitting their respective contents to one another;

control apparatus for right-shifting a content of said A register and said fifth register and apparatus for transmitting at each shift the right-hand bits of said A and fifth register to said multiplexer;

said multiplexer further having apparatus for selecting its input from one said B, (N−1)/2+1 and B+(N−1)/2+1 registers depending on the two aforesaid right-hand bits transmitted to it, wherein the multiplexer comprises n cells, each cell comprising three AND gates, and an OR gate receiving its input from the AND gates and providing a bit of the multiplexer output, each AND gate having three inputs, one input being connected to one of the B, (N−1)/2+1 and B+(N−1)/2+1 registers, and the other two being connected to the apparatus for transmitting the right-hand bits of the A and fifth registers to the multiplexer.

34. A circuit according to claim 33, further comprising a digital signature apparatus operative to employ the final content in a digital signature operation.

35. A circuit according to claim 34, wherein the digital signature operation comprises generation of a digital signature.

36. A circuit according to claim 34, wherein the digital signature operation comprises verification of a digital signature.

37. A circuit for performing the operation $A \cdot B \cdot 2^{-n}$ mod N, comprising:

four registers for storing A, B and the values (N−1)/2+1 and B+(N−1)/2+1;

a fifth register a final content of which is the result of the operation;

a serial/parallel multiplier having connections for receiving parallel input from either said B, (N−1)/2+1 or B+(N−1)/2+1 registers and serial input from said A register, and having apparatus for selecting one of said parallel inputs;

a demultiplexer receiving input from said multiplier and further receiving an input from counter apparatus, said demultiplexer being connected to said multiplier to feed back to it the input received therefrom during the first n clock cycles and to transmit to said fifth register the input received during the next n clock cycles;

the value stored in said fifth register after said additional n clock cycles being the final result of the operation; and apparatus being inserted in the line from the demultiplexer to the multiplier for delaying by one clock cycle the input transmitted therethrough, wherein the multiplier comprising n serially connected cells, each comprising 3 AND gates and an OR gate receiving its input from the AND gates, each AND gate having 3 inputs, one input being connected to one of the B, (N−1)/2+1 and B+(N−1)/2+1 registers, and the other two being connected to parallel input selecting apparatus, an adder having a first input which is the output of the OR gate, having a second input from the preceding cell through a 1-clock delay apparatus, a feedback to itself through a 1-clock delay apparatus, and an output to the next cell, the first of said cells having its first input from A register and the last of said cells transmitting its output to the demultiplexer.

38. A circuit according to claim 37, further comprising digital signature apparatus operative to employ the final content in a digital signature operation.

39. A circuit according to claim 38, wherein the digital signature operation comprises generation of a digital signature.

40. A circuit according to claim 38, wherein the digital signature operation comprises verification of a digital signature.

* * * * *